United States Patent
Tamayo De Miguel et al.

(10) Patent No.: US 6,906,450 B2
(45) Date of Patent: Jun. 14, 2005

(54) RESONANT PROBE DRIVING ARRANGEMENT AND A SCANNING PROBE MICROSCOPE INCLUDING SUCH AN ARRANGEMENT

(75) Inventors: Javier Tamayo De Miguel, Madrid (ES); Andrew David Laver Humphris, Redland (GB); Mervyn John Miles, Kingsweston (GB)

(73) Assignee: The University of Bristol (GB)

( * ) Notice: Subject to any disclaimer, the term of this patent is extended or adjusted under 35 U.S.C. 154(b) by 181 days.

(21) Appl. No.: 10/241,000
(22) PCT Filed: Apr. 12, 2001
(86) PCT No.: PCT/GB01/01669
§ 371 (c)(1), (2), (4) Date: Dec. 5, 2002
(87) PCT Pub. No.: WO01/81857
PCT Pub. Date: Nov. 1, 2001

(65) Prior Publication Data
US 2003/0137216 A1 Jul. 24, 2003

(30) Foreign Application Priority Data
Apr. 20, 2000 (GB) .............................................. 0009902
Mar. 21, 2001 (GB) ......................................... 000107136

(51) Int. Cl.⁷ .............................................. H01L 41/09
(52) U.S. Cl. ................................... 310/317; 310/316.01
(58) Field of Search ............................. 310/316.01, 317

(56) References Cited

U.S. PATENT DOCUMENTS

| | | | |
|---|---|---|---|
| 5,753,814 A | | 5/1998 | Han et al. |
| 5,910,993 A | * | 6/1999 | Aoki et al. ............... 381/71.12 |
| 5,955,660 A | | 9/1999 | Honma |
| 5,966,053 A | | 10/1999 | Durig et al. |
| 6,038,916 A | | 3/2000 | Cleveland et al. |
| 6,079,254 A | | 6/2000 | Chen et al. |

FOREIGN PATENT DOCUMENTS

JP 2000-28624 A 1/2000

* cited by examiner

Primary Examiner—Thomas M. Dougherty
(74) Attorney, Agent, or Firm—Reising, Ethington, Barnes, Kisselle, P.C.

(57) ABSTRACT

A drive system is provided for a resonating probe device, such as a scanning probe microscope, wherein the amplitude of the drive signal is controlled by feeding back a phase shifted and amplified component of the amplitude of oscillation of the resonating element. Means are provided for electronically enhancing the quality factor of a resonating probe device when operated in a liquid environment. Such enhancement of the quality factor improves the sensitivity of the probe device.

15 Claims, 14 Drawing Sheets

RESONANT PROBE DRIVING ARRANGEMENT AND A SCANNING PROBE MICROSCOPE INCLUDING SUCH AN ARRANGEMENT

The present invention relates to an apparatus for, and method of driving a mechanical oscillator as, for example, found in scanning probe microscopes or in chemical sensors and bio-sensors utilising resonating structures. The use of positive feedback makes it possible to modify the performance of the oscillator, especially within a liquid environment.

Scanning force microscopy, which includes atomic force microscopy (AFM) uses a microscopic cantilever to provide atomic and molecular resolution of organic and inorganic substances in air, ultra high vacuum, and in liquids. The cantilevered element is formed with a sharp tip on a microscopic scale. If the tip of the cantilever is brought into close proximity with the surface of a sample or medium under investigation, forces on the atomic scale cause an interaction between the very end most section of the tip, and typically a single atom thereon, and an atom or molecule in the sample. This interaction can be measured, and used for imaging surfaces on the nanometer scale, or for measuring mechanical properties of the sample, or adhesion between the sample and the tip.

Some of the main limitations to achieving high resolution have been the mechanical properties of the sample and the adhesion between the sample and the substrate. The issue of adhesion has been particularly critical in materials such as biomolecules. The native structure of biomolecules is best imaged in a buffer solution. However, in these conditions the biomolecules exhibit low adhesion on atomically flat substrates such as mica or graphite due to the screening of attractive forces. The tip of the microscopic sensor is scanned with respect to the surface of the media under investigation, for example in a raster scanning form, in order to produce an image of a portion of the media. This scanning motion can give rise to lateral forces that appear at the tip of the sensor during the scan which, in a traditional contact mode of scanning can displace or destroy the molecules under investigation. Furthermore, researchers have reported that the visualisation of undistorted biomolecules at molecular resolution requires forces as small as 100 pN to be resolved.

Scanning force microscopes can be operated in a dynamic or intermittent contact mode in which the cantilever oscillates by a few manometers, and may intermittently touch the sample. This technique has significantly reduced the lateral forces, allowing routine imaging of proteins, DNA and cells. However the forces acting along the surface normal are still of the order of several nano newtons, thereby preventing high resolution.

The force required to excite a cantilever to a given amplitude A is kA/Q where k is the spring constant of the cantilever and Q is the quality factor. This expression is valid if the excitation frequency is equal to the resonance frequency of the cantilever and thereby gives an indication of the force applied to the sample. However this expression also indicates the main limitation of oscillating the cantilevered element in a liquid, namely the low quality factor of the cantilever in a liquid environment.

A further complication arises from the driving mechanism used in the liquid environment. The cantilever is usually excited through acoustic waves induced in the liquid by a piezoelectric element placed in the liquid. This allows coupling to occur at frequencies where the liquid resonance is coupled to the cantilever resonance, this coupling can, as shown in FIG. 1 of the accompanying drawings, make it exceptionally difficult to identify the resonance peak of the cantilever. The real frequency spectrum of the cantilever can be seen by directly exciting the cantilever. For the purposes of identifying the resonance spectrum of the cantilever, the cantilever was coated with a thin layer of ferromagnetic material and excited by applying a sinusoidal magnetic force in the vicinity of the cantilever. A comparison of FIGS. 1 and 2 shows that the spectrum obtained by mechanical excitation has many peaks compared to the cantilever's resonance spectrum, and also that the resonance peak of the cantilever is broad. In fact, the strong hydrodynamic force between the cantilever and the fluid surrounding it results in very low quality factors, in the region of about 1 to 4 being obtained which is approximately two orders of magnitude lower than those that would be expected for operating a similar cantilever in air. This limits the minimum force applied to the sample, and thus for the usual conditions which might be expected in a tapping mode of operation k=0.4 $Nm^{-1}$, Q=2 and A=5 nm, the excitation force is about 1 nN. This excitation force is about two orders of magnitude higher than the forces suitable for the visualisation of the stricture of biomolecules at a molecular level.

It is also known that chemical and bio-sensors utilising micro-fabricated cantilevers of silicon or silicon nitride can be made by coating one or both sides of the cantilever with a suitable reagent or receptor. Where both sides of the cantilever ate coated with a receptor (i.e. sensing molecules) the effective mass of the cantilever changes in the presence of the appropriate receptor-binding ligand (i.e. molecules to which the sensing molecules are sensitive). A surface stress method may also be employed in which only one side of the cantilever is coated with a receptor. The surface stress on this side of the cantilever changes as the target substance interacts with the receptor, producing a cantilever bending as the surface expands or contracts. The motion of the cantilever can be optically examined, for example to look for bending of the cantilever by using an optical lever to magnify the deflection from the cantilever. The reflected light can be detected by a pair of photo-detectors and the position of the cantilever can be established by looking at the ratio of the outputs from the photo-detectors.

Bio-sensors and chemical sensors for use in liquids have hitherto been fabricated using the surface stress method because the surface energy (and hence tendency for the cantilever to bend) is very sensitive to the adsorption of a sub-monolayer of material, whilst the corresponding change in mass can be negligible. The micro-fabricated cantilever are extremely sensitive to temperature, and initial drift resulting from temperature fluctuations and chemical reactions with the cantilever can be significant. In fact Butt (J colloid and interface Sci, 180 (1996) 251) has reported experiments with chemical sensors and bio-sensors in liquid using the surface stress method in which the apparatus needed to equilibrate for 1 to 2 days before measurement could be taken.

Scanning probe microscopes are commercially available. Workers have investigated schemes for modifying the effective Q of the sensor tip. B Anczykowski et al. "Analysis of the interaction mechanisms in dynamic mode SFM by means of experimental data and computer simulation" Applied Physics A 66, 5885–5889 (1998) describe using a feedback mechanism to vary the effective Q of a nanosensor which should work well in a vacuum or low loss environment.

A set up for modifying the effective Q of a sensor is illustrated in FIG. 3. A laser 1 is used to illuminate a cantilever 2. The cantilever 2 is driven by a piezoelectric element which receives a drive signal from a function generator 4 via an adder 5. Light reflected from the cantilever is directed by an optical path 6 towards a processor 10 for forming the ratio of, or the difference between the signals, received at a pair of photo-detectors. Other detectors of the cantilever oscillation, such as a tuning fork, optical interference etc. could be used.

As shown, a portion of the received signal from the detection circuit 10 is fed to a variable phase shifter 12, and from the phase shifter to a variable gain amplifier 14. The output of the amplifier is then added to the signal supplied from a function generator 4 and used to drive the sensor via the piezoelectric element.

This system should work well in a vacuum or low loss environment. However in a liquid environment the operating properties of the cantilever can change as it comes into proximity with the surface under investigation, consequently the feedback system will supply a drive signal which is not at the resonant frequency of the probe. Furthermore because the coupling between the probe and the driver in a fluid filled system need not be that strong, this can result in instances where the feedback signal from the probe is at a different frequency to the drive signal, thereby giving rise to interference at the drive frequency which may manifest itself as a beat which amplitude modulates the drive signal this in turn degrades the signal measurement capabilities of the microscope. Additionally, because of the low quality factor in liquid, energy is distributed into the higher harmonics of the cantilever. These higher harmonics may have a different experimental phase response to the first harmonic, and when their higher frequency amplitude signal is fed back into the drive signal, it will tend to destabilise the motion of the cantilever.

Other prior art arrangements are known. U.S. Pat. No. 5,966,053 discloses an apparatus for controlling a mechanical oscillator. A feedback signal from the mechanical oscillator is mixed with a reference frequency in order to frequency convert it to an intermediate frequency. The intermediate signal is provided to a phase locked loop and to a first input of a balancing network. A second input of the balancing network receives an output of the phase locked loop. The balancing network combines the signals at its inputs, these are then phase shifted and amplified. The phase shift is provided to ensure that an appropriate phase relationship can be maintained between the driving signal as generated by the feedback loop and cantilever's response. The gain is controlled to ensure that the output of the amplifier is set to a predetermined value before the signal is frequency converted to the cantilever's resonant frequency.

In a fluid environment as the end of the cantilever approaches the surface of the sample sufficiently closely (in the order of 1 $\mu$m), the fluid medium surrounding the cantilever can effectively become trapped between the cantilever and the sample under investigation. This can give rise to both a change in the effective mass of the resonating cantilever and the spring constant. These effects do not occur when equivalent scanning force microscopy is carried out in a gaseous or high vacuum environment, and consequently workers in this field have ignored these effects.

In order to implement scanning force microscopy in a liquid environment, it is desirable to be able to measure the resonant frequency of the cantilever, to track the resonant frequency accurately, and to synthesise a higher quality factor.

For bio-sensor and chemical sensor work the issue of fluid trapping adjacent the cantilever, or such other resonant structure as may be fabricated, may also be an issue if the cantilever is fabricated close to a substrate.

According to a first aspect of the present invention, there is provided a control apparatus for controlling a driving signal used to stimulate a resonating sensing element, in which the control apparatus is responsive to a sensor used to monitor the motion of the sensing element and in which the control apparatus comprises a signal processor for filtering signals from the sensor so as to remove harmonics above a predetermined order from the signal, and a drive signal controller responsive to the output of the signal processor for adjusting the driving signal so as to maintain the sensing element in resonance.

The signal processor may be a digital or analogue device and may perform one or more of filtering, phase locking, phase shifting or other signal processing operations.

Preferably the sensing element is a micro-fabricated element. Such an element may be a resonant bridge, but preferably is a cantilever. Preferably the cantilever is part of a scanning force microscope. The cantilever may be arranged such that its longitudinal axis is substantially parallel to a nominally flat surface under investigation. Alternatively the cantilever may be arranged such that its longitudinal axis is substantially normal to a planar surface under investigation. Both these modes of operation can be used to investigate the properties of the surface. Similarly both these configurations may be used in chemical sensors, bio-sensors or other sensors where the response of the element can be modified by an external influence.

The sensing element is preferably driven by a piezoelectric element or an alternating magnetic or an alternating electrostatic field, or by any other means.

Alternatively a drive element may be mechanically coupled to the sensing element via a liquid medium.

Preferably the sensor for monitoring the motion of the sensing element is an optical sensor. Commercially available scanning force microscopes already often include optical detection of the motion of the sensing element and hence existing detection technology can be used. Other sensing technologies may be used, such as piezo-resistive elements.

Preferably the control apparatus analyses the signal from the sensor to identify a phase shift between the motion of the sensing element and the driving stimulus applied to the element.

Preferably the drive signal controller adjusts the phase of the driving signal so as to maintain the phase shift at substantially a predetermined value.

Preferably the phase shin is maintained at 90 degrees, thereby ensuring that the sensing element is driven at its resonant frequency. However, the other phase shifts could be maintained if desired.

Preferably the phase shift is measured by a phase sensitive detector, such as a lock-in amplifier. However it will be appreciated that digital processors and the like may also be used to measure the phase difference. Advantageously the output of the phase detector is fed to a control input of the voltage control oscillator via a controller, such as a proportional-integral controller which serves to cause the phase difference to tend towards its predetermined value.

Advantageously at least one further feedback loop is provided for controlling a property, such as the amplitude, of the drive signal supplied to the sensing element. This may be performed by amplifying and feeding a phase shifted detector signal back to the driver. Alternatively, the amplitude of the frequency generator may be directly modulated as a function of the detector signal in order to control the amplitude of the drive signal. Advantageously the detector signal is filtered to reduce the higher frequency content of the signal. That is, to prevent the signal from the higher harmonics from being fed back into the drive signal. This feedback loop performs a positive feed back system thereby simulating an effective Q in excess of the actual Q of the sensor.

Additionally or alternatively a single parameter of the detector signal may be measured and used to control a parameter of the drive signal. A sinusoid can be considered as having three parameters that define it, namely frequency, amplitude and phase. For systems which take the sensor signal, amplify it and add it to the drive signal, it follows that the amplitude, phase and possibly frequency spectrum of the drive signal are modified as a result of the feedback from the drive signal. However, if only the phase of the sensor signal was measured (discarding the other two parameters) then this single parameter could be used to control a single parameter of the drive signal, for example it's phase. This concept could be extended to cover two of the parameters while omitting the third.

According to a second aspect of the present invention, there is provided an apparatus for controlling the amplitude of a drive signal applied to a resonating sensing element, the controller being responsive to at least one sensor for measuring the oscillation of the sensing element, and comprising a signal processor for extracting a parameter of the oscillation, and for using the parameter of oscillation to control a parameter of the power supplied to drive the sensing element in accordance with a first transfer function, and at least one of the signal processor and the drive element being unresponsive to other parameters of the oscillation.

Preferably the parameter of oscillation is the magnitude of the oscillation and only information about the magnitude is used to control the signal sent to the drive element for driving the sensing element. Additionally or alternatively only the phase or only the frequency is measured and used to control the phase or frequency, respectively, of the drive signal. Thus, in essence, the multiple parameters used to define the sinusoid are made orthogonal to one another and the feedback loop only sees (and passes information pertaining to) it's associated one of the parameters. Multiple feedback loops may be provided to handle the parameters independently of each other.

According to a third aspect of the present invention, there is provided an apparatus for driving a resonating element at its resonant frequency, the apparatus comprising a frequency signal generator for generating a drive signal and drive means responsive to the drive signal so as to excite the resonating element, at least one detector for detecting a response of the resonating element to the drive signal and signal processing means for measuring a phase shift between the drive signal and the response thereto and for controlling the frequency of the drive signal so as to maintain a predetermined phase shift.

According to a further aspect of the present invention, there is provided a method of driving a resonating element, comprising the steps of monitoring the vibratory motion of the resonating element, comparing a phase difference between a signal used to excite the resonating element and the motion of the element, and varying the frequency of the signal used to excite the resonating element so as to maintain the phase difference at a predetermined value.

Embodiments of chemical, bio-chemical or other sensors utilising resonating structures and constituting aspects of the present invention may comprise arrays of resonating elements. Thus, for example, a plurality of micro-machined cantilevers may be provided in an array. Each cantilever may be sensitised to detect different targets, chemicals or reagents. Additionally and/or alternatively, a few cantilevers may be used to act as references to isolate non-specific signals. The cantilevers may be fabricated to have distinct and different resonant frequencies. In such an arrangement a single transducer and detector may be used to drive and interrogate all of the transducers either simultaneously or in sequence. Since each transducer resonates at an individual frequency, a drive signal to resonate all of the transducers can be constructed as the superposition of the individual resonating frequencies. Similarly, the signal received from the detector element will also be a superposition of the motions of the individual cantilevers. These individual signals can be separated from one another, for example by filtering in either the analogue or digital domains, and then acted upon by individual controllers, again in either the analogue or digital domains. Alternatively, a single frequency stepable controller may be arranged to access each cantilever in turn.

Additionally and/or alternatively where multiple resonating elements are provided they may be coupled together, either by direct connection or through mechanical transfer within the fluid in order that a test for the presence, absence or a mixture thereof of multiple reagents/targets may be detected via a single drive and interrogation process.

Typically a cantilever is fabricated over a pit formed in the silicon or a silicon nitride substrate. Either one or both of the cantilever and pit may be coated with one or more receptor substances. Thus it is possible that the pit or silicon substrate may be treated with a first substance which reacts with target compound to form a by-product, and wherein the sensing element may be coated with a substance responsive to the by-product. Thus direct detection of target substances may be performed.

The present invention will further be described, by way of example, with reference to the accompanying drawings, in which.

Figure 3:
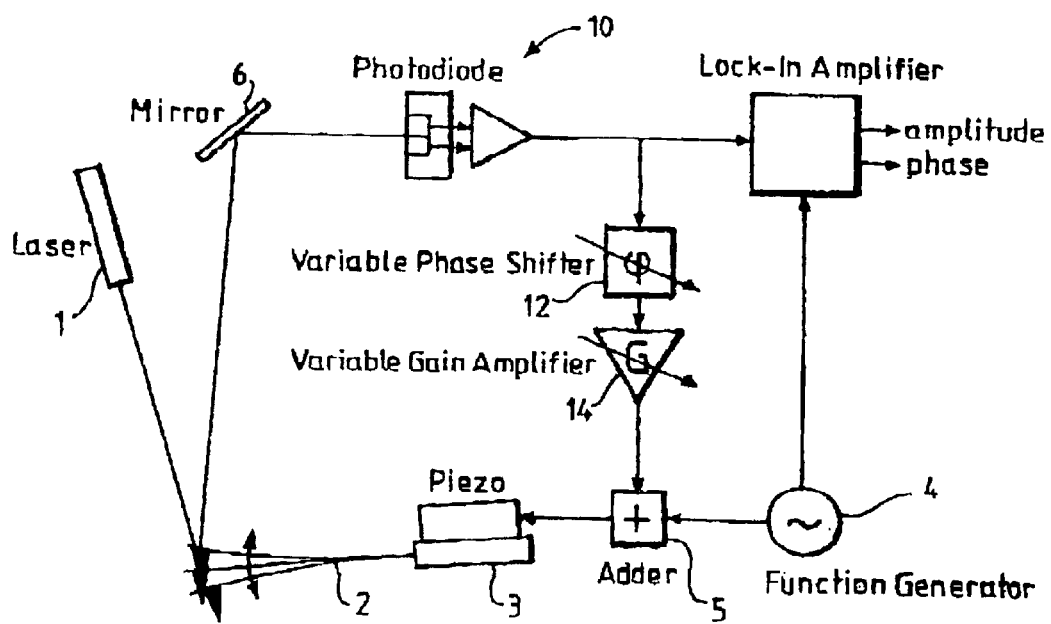
Figure 4:
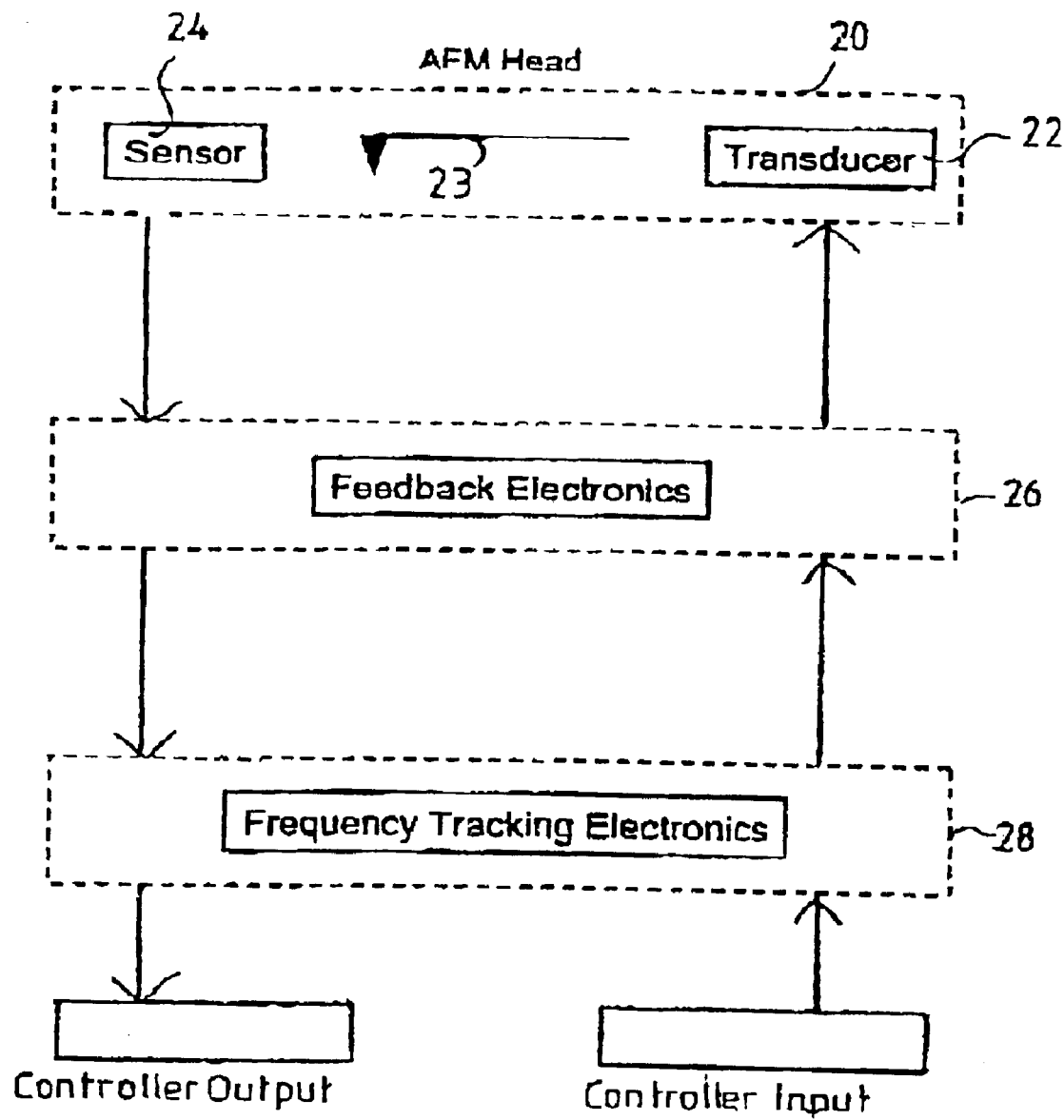
Figure 5:
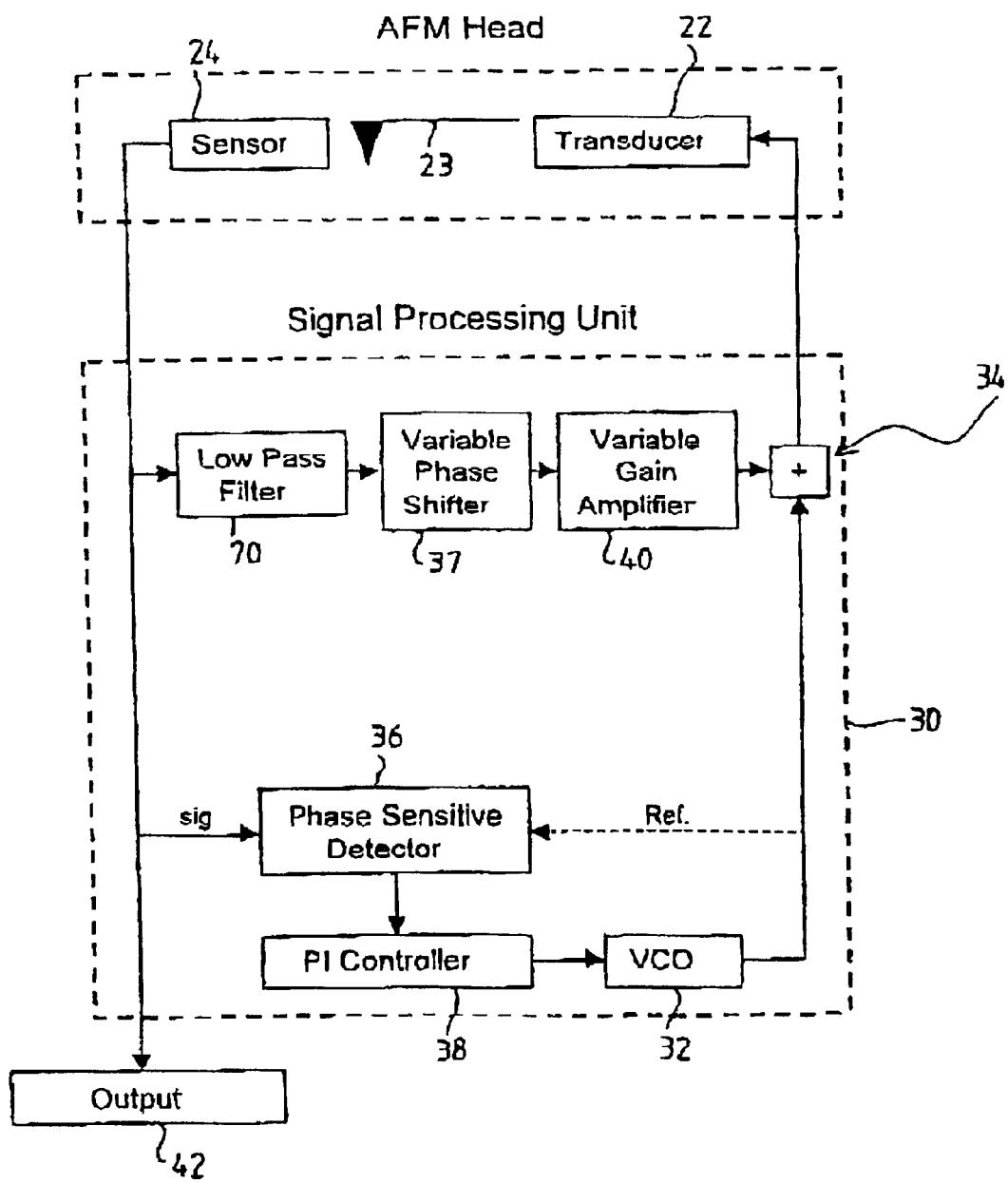
Figure 6:
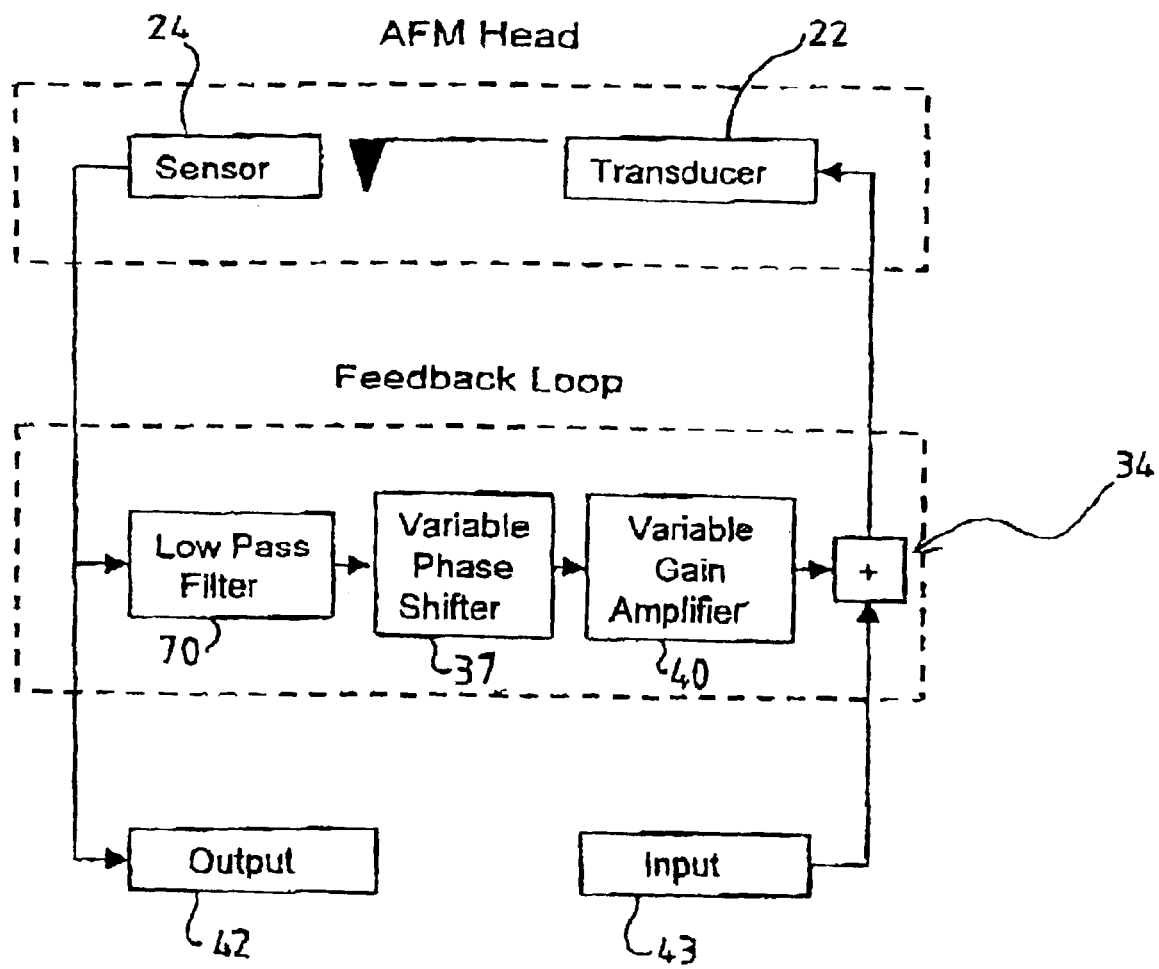
Figure 7:
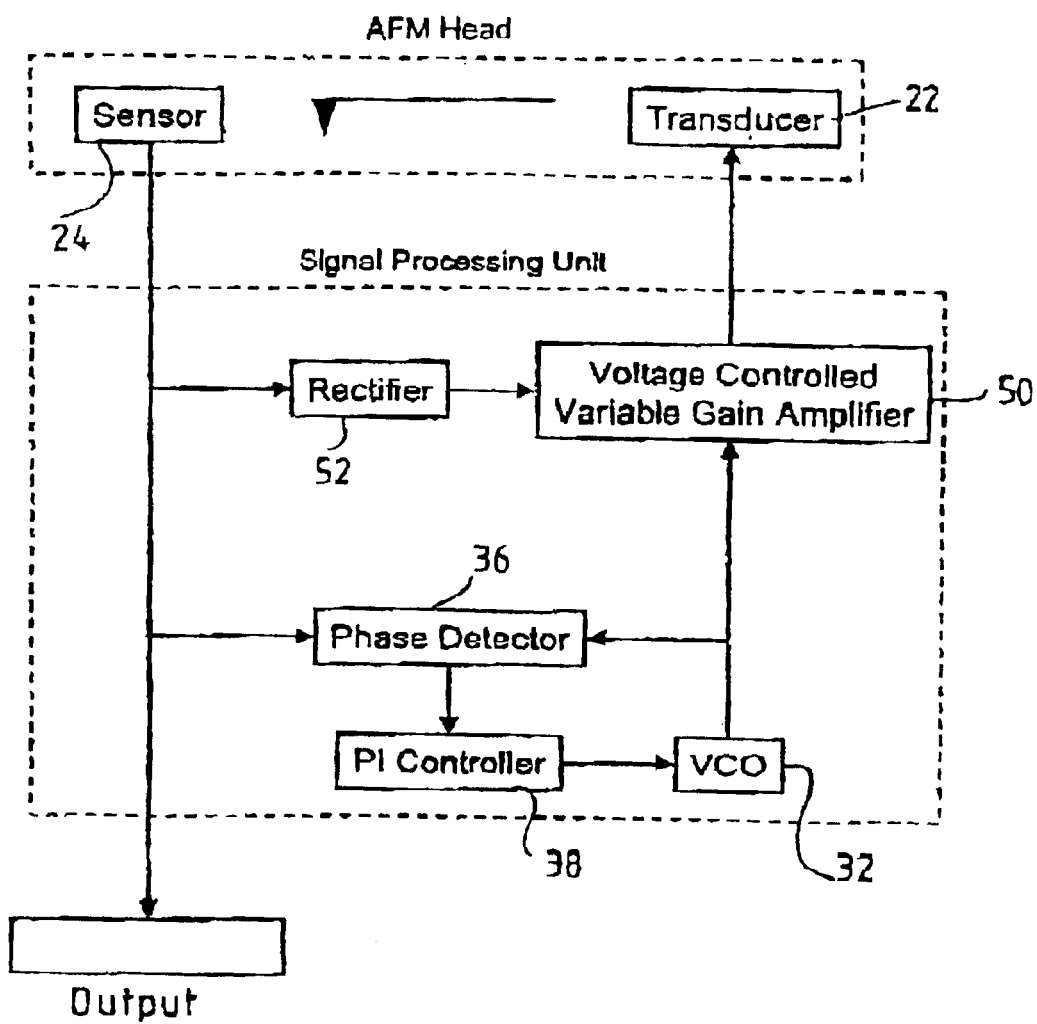
Figure 8:
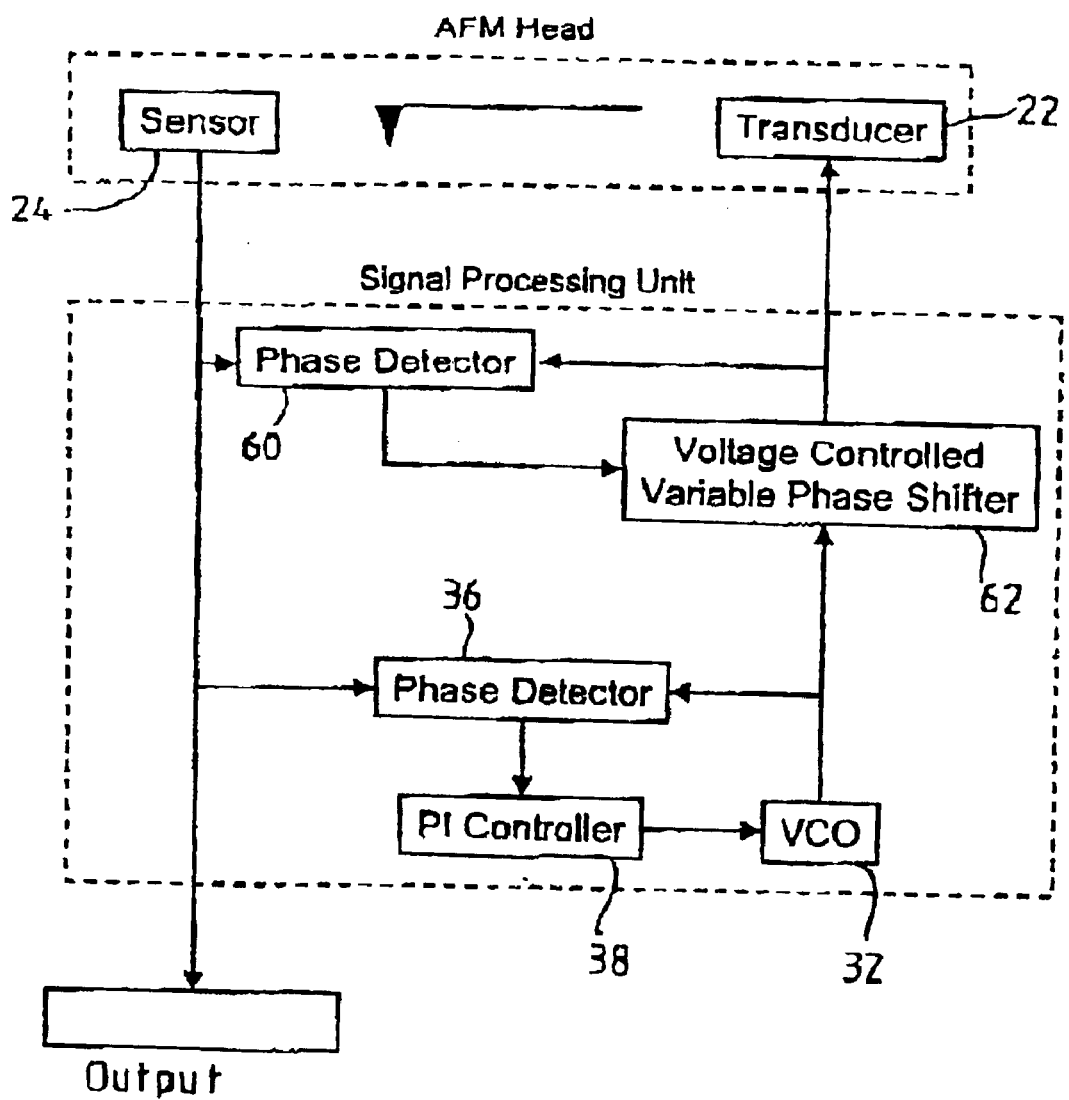

FIG. 3 schematically illustrates the sensing and feedback arrangement of a prior art scanning force microscope;

FIG. 4 is a schematic diagram illustrating the components constituting an embodiment of the present invention;

FIG. 5 is a block diagram of a first embodiment of the present invention;

FIG. 6 is a block diagram of a second embodiment of the present invention;

FIG. 7 is a block diagram of a third embodiment of the present invention;

FIG. 8 is a block diagram of a fourth embodiment of the present intention.

Figure 9:
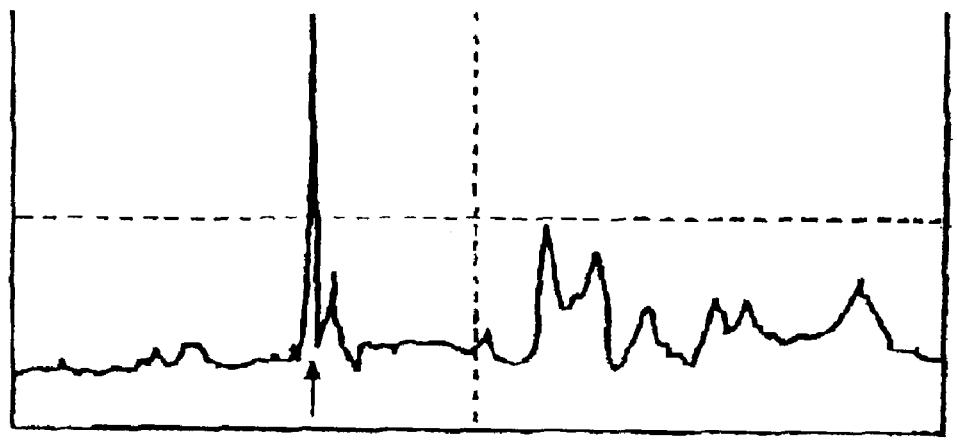
Figure 10:
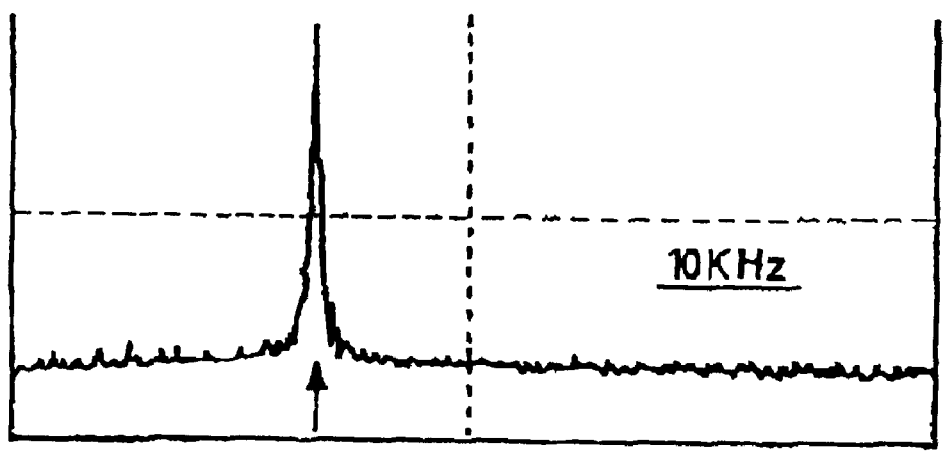
Figure 11A:
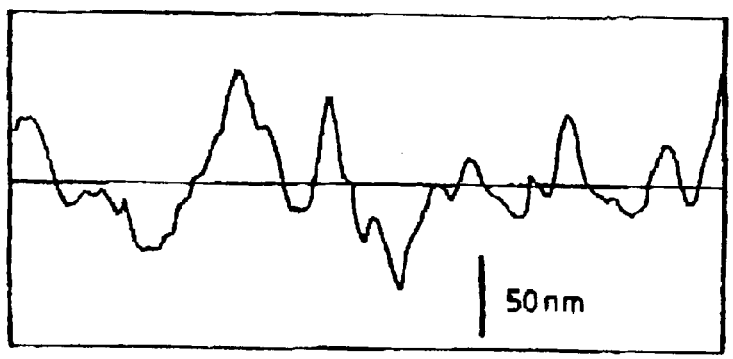
Figure 11B:
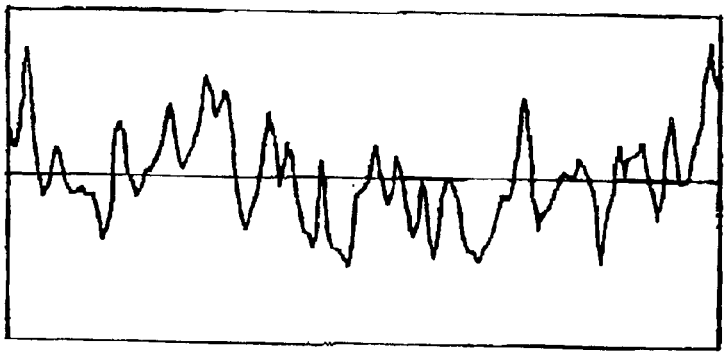
Figure 11C:
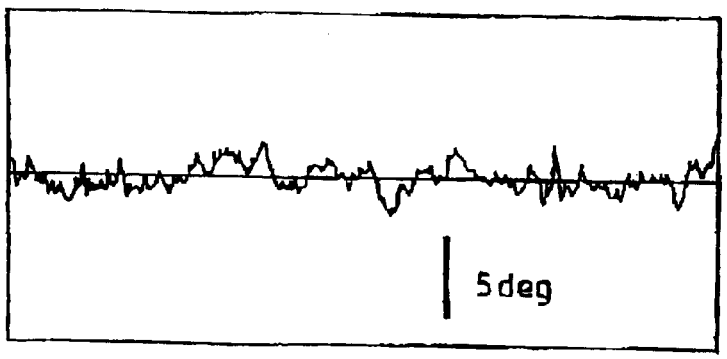
Figure 11D:
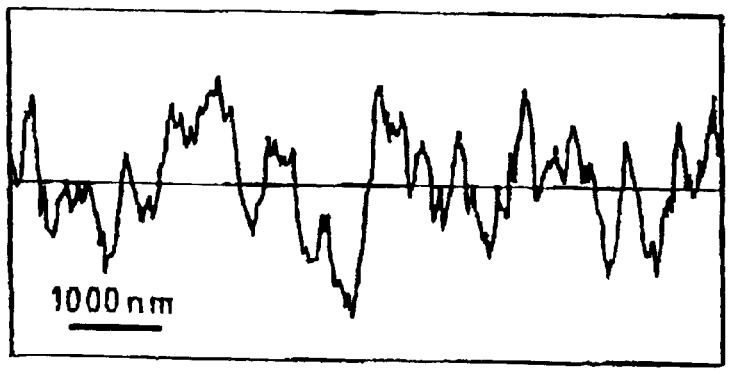

FIG. 9 illustrates the response of the cantilever to the drive signal as a function of frequency in a mechanical excitement mode, when Q enhancement is applied;

FIG. 10 represents the response of the cantilever as a function of frequency with Q enhancement when driven by magnetic field excitation;

FIGS. 11a–11d schematically compare experimental results of topograph profiles (FIGS. 11a and 11b) and corresponding phase response (FIGS. 11c and 11d), where FIGS. 11a and 11c are taken without Q enhancement and FIGS. 11b and 11d were measured using Q enhancement.

Figure 12:
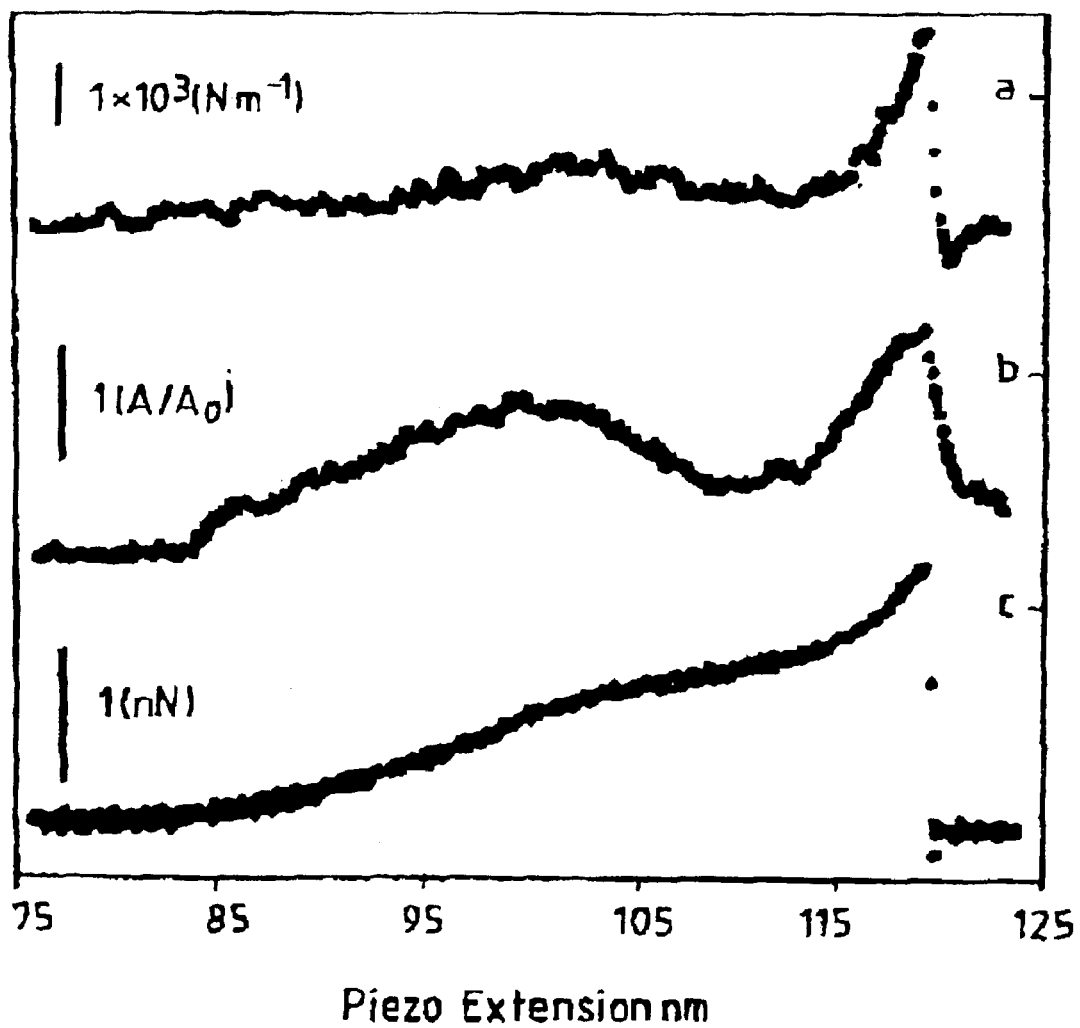
Figure 13:
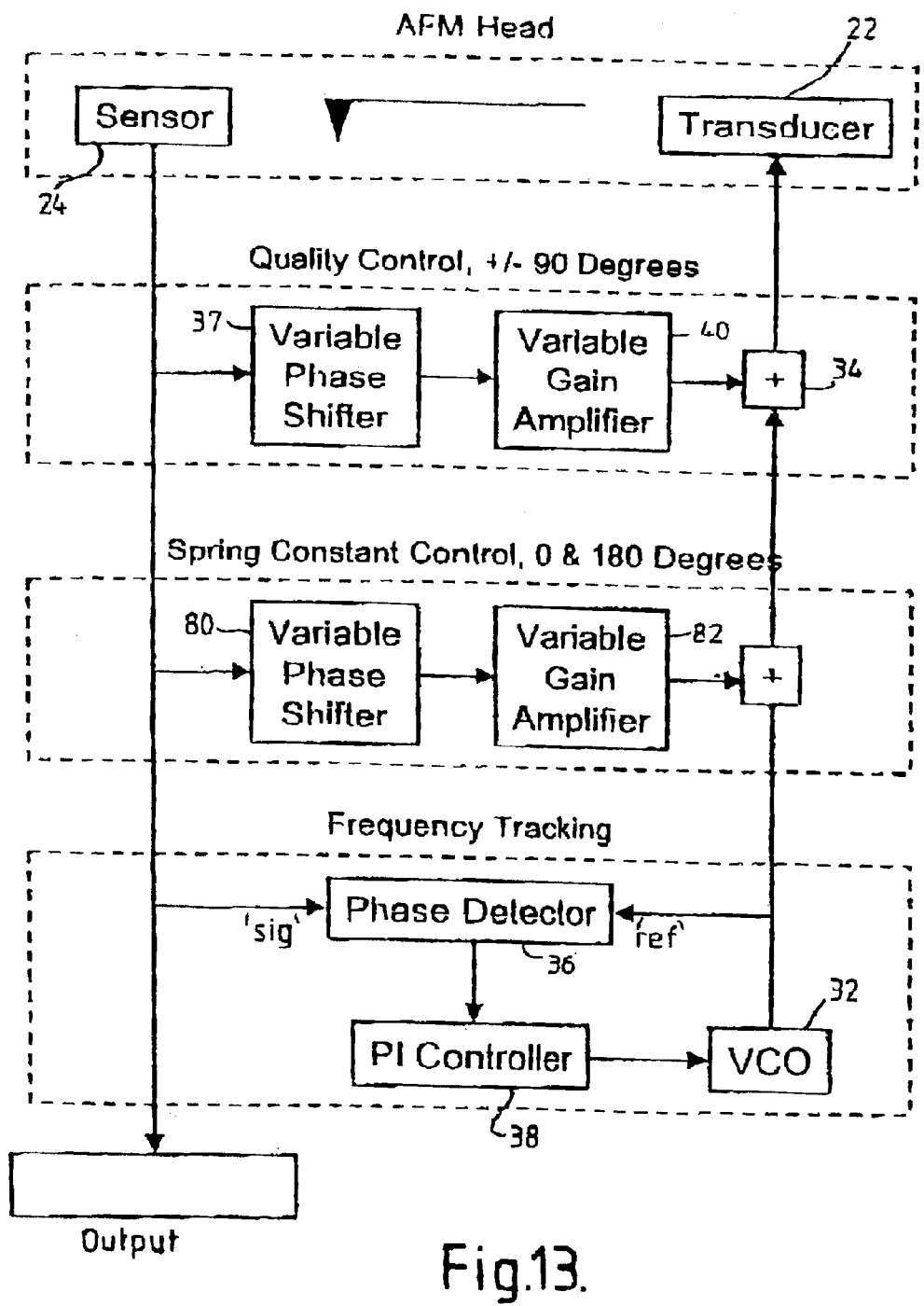
Figure 14:
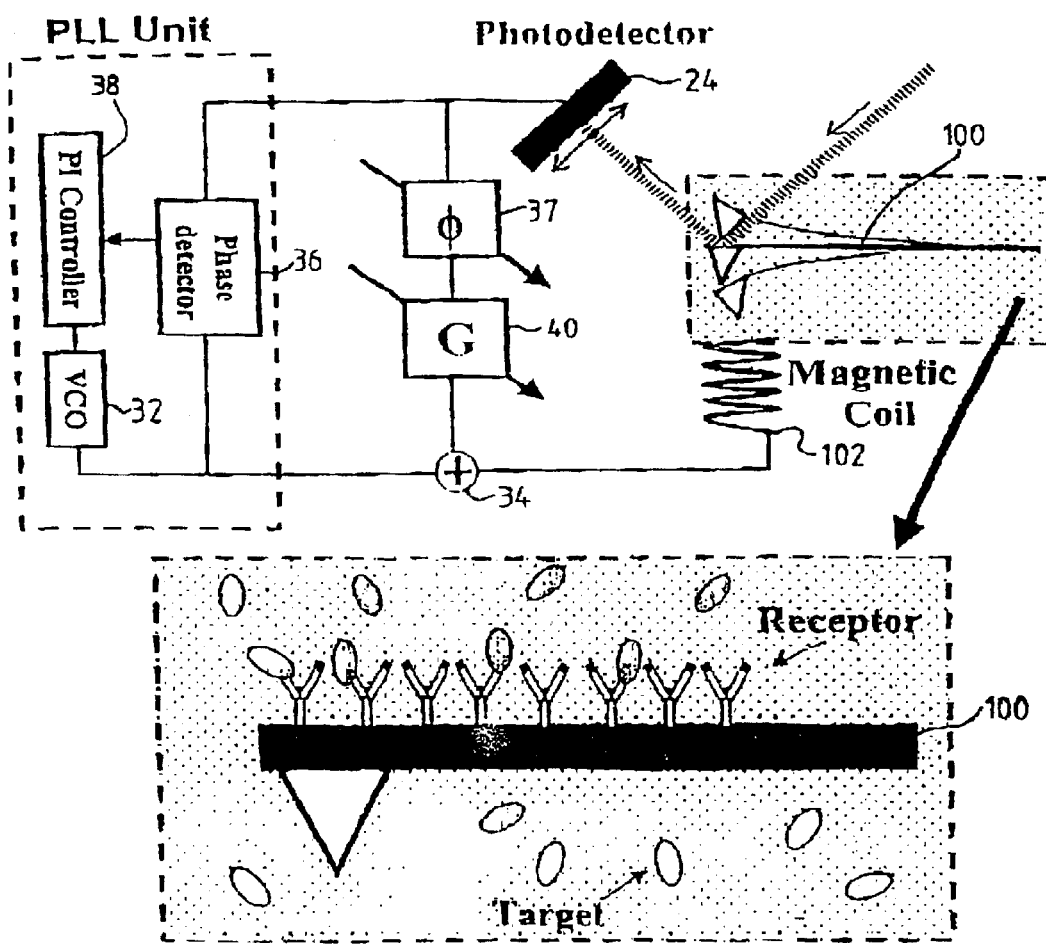
Figure 15A:
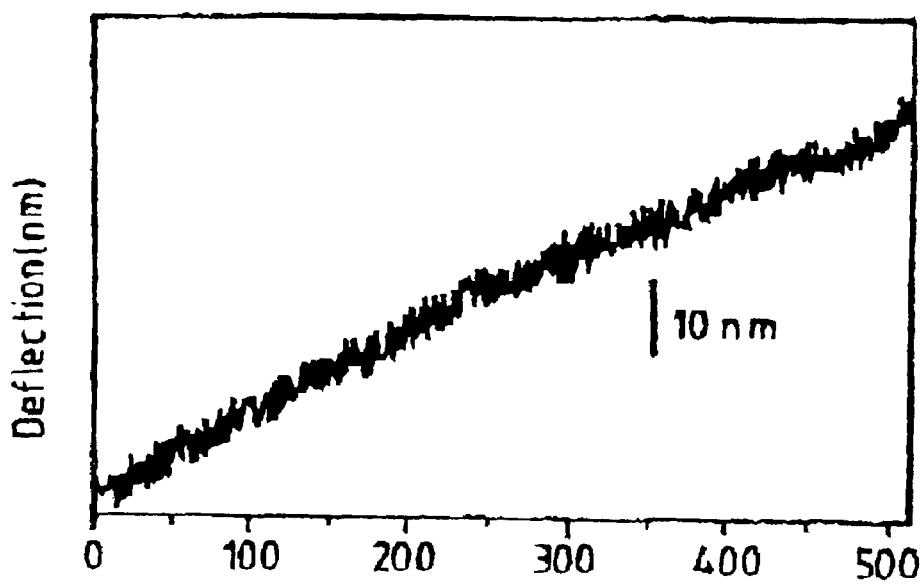
Figure 15B:
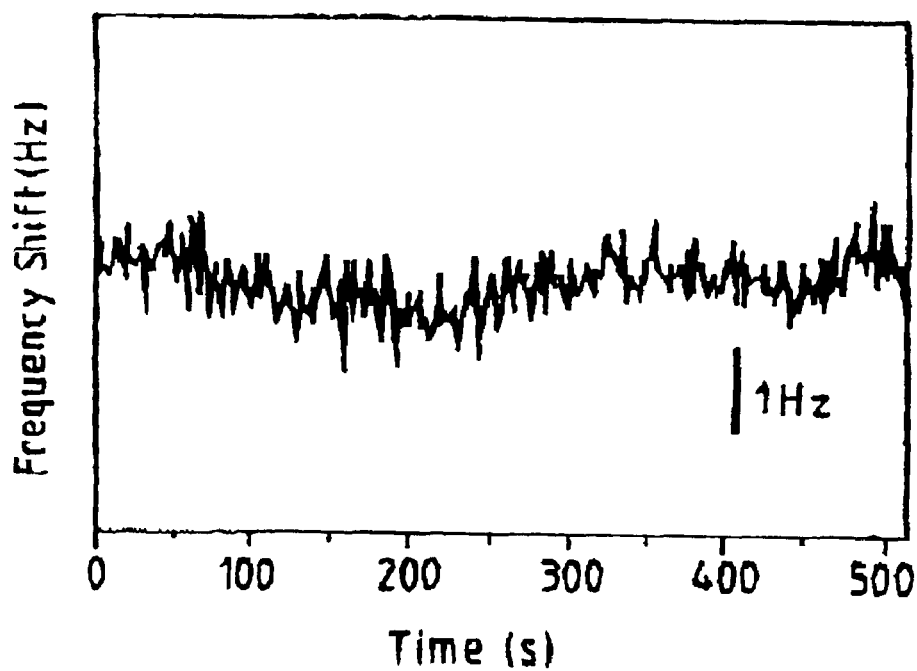
Figure 16A:
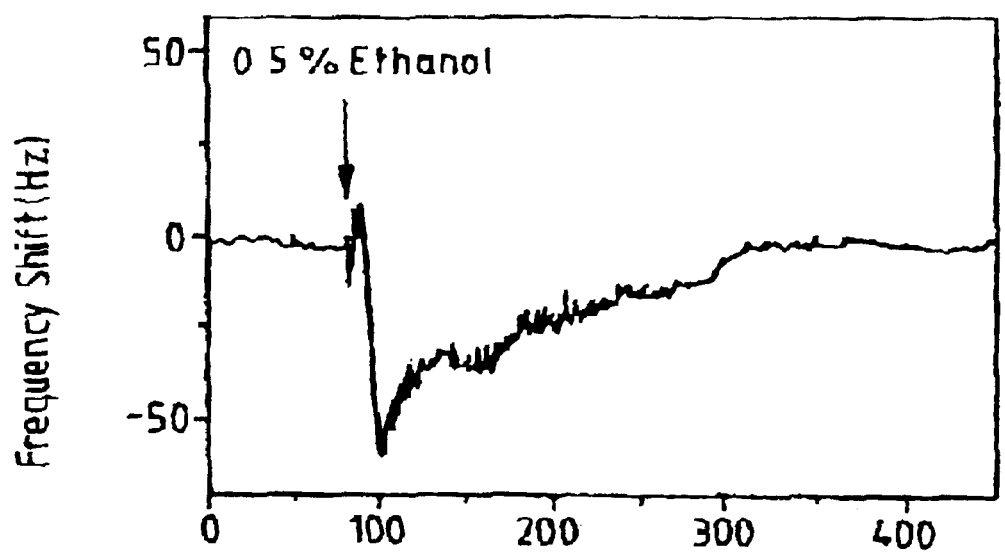
Figure 16B:
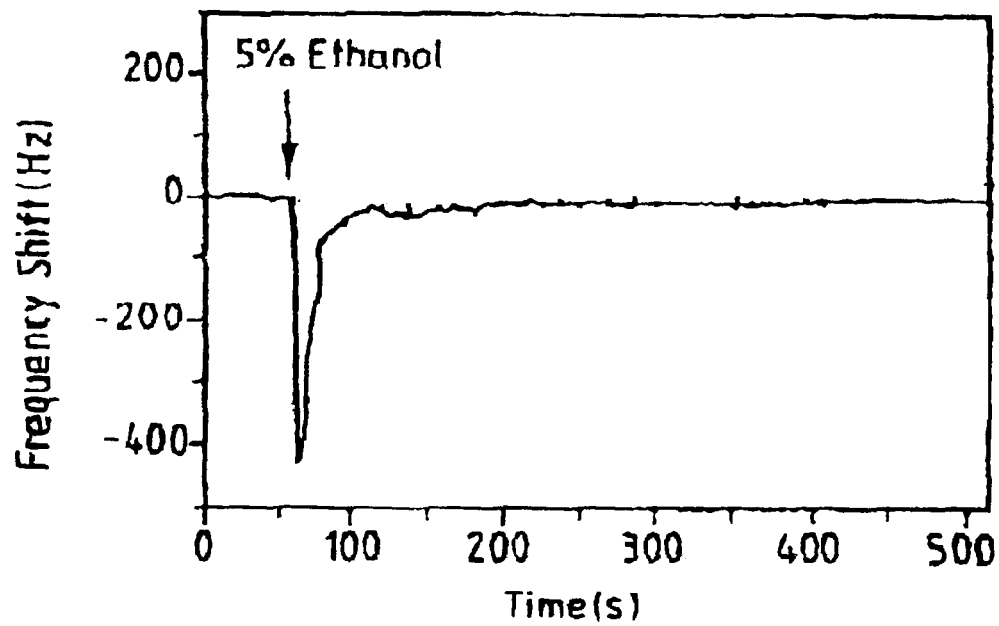
Figure 17A:
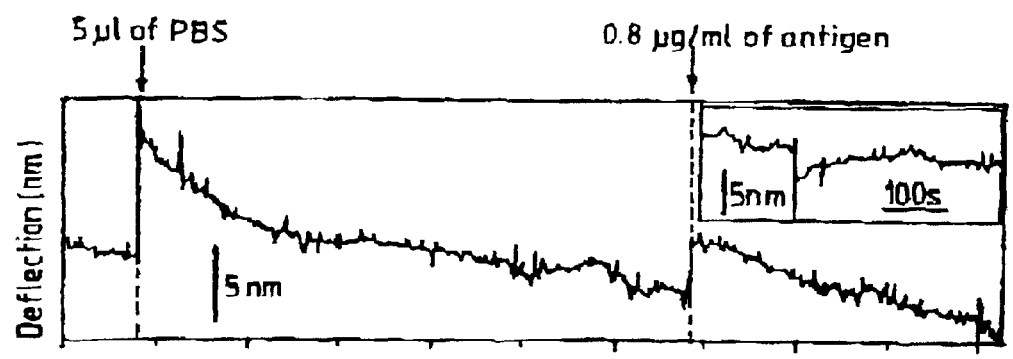
Figure 17B:
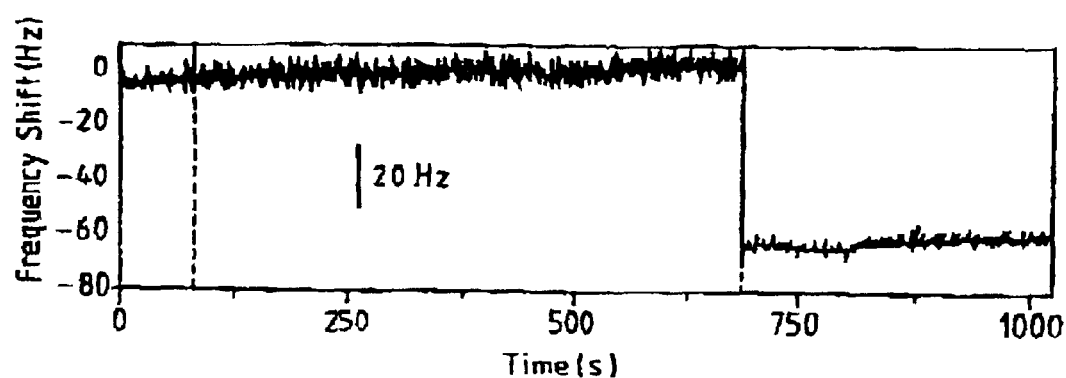

FIG. 12 illustrates results obtained using a scanning force microscope with Q enhancement to examine the dynamic properties of molecules;

FIG. 13 illustrates a control apparatus constituting a further embodiment of the present invention;

FIG. 14 schematically illustrates a chemical sensor constituting an embodiment of the present invention;

FIGS. 15a and 15b illustrate experimental results illustrating variations in deflection and resonant frequency, respectively, for a cantilever as a result of thermal drift;

FIGS. 16a and 16b illustrate experimental results showing changes in resonant frequency for a chemical sensor constituting an embodiment of the present invention, and FIGS. 17a and 17b illustrate changes in deflection and resonant frequency for a micro-machined cantilever.

For an oscillating cantilever the excitation force applied thereto is composed of the sum of two signals. One of these signals is the sinusoidal excitation force $F_1=F_0 e^{j\omega t}$, and the other is the feedback signal derived from the motion sensor, typically a photo diode, that is amplified and phase shifted.

The cantilever oscillation in intermittent contact with the sample can be expressed as:

$$Z = Z_o + A_1 e^{j(\omega t - \phi)} + A_2 e^{j(2\omega t - \phi t)} + \ldots$$

Ideally, if the feedback loop is working correctly, the second term of the excitation force applied to the cantilever is given by:

$$F_2 = G A_1 e^{j(\omega t - \phi + \pi/2)}$$

Neglecting minor contributions of higher order harmonics, this force is proportional to the velocity of the cantilever:

$$\frac{dz}{dt} = \omega A_1 e^{j\left(\omega t - \phi + \frac{\pi}{2}\right)}$$

Then the differential equational that governs the motion of the cantilever can be approximated by:

$$m \frac{d^2 Z}{dt^2} + (\gamma - G/\omega) \frac{dz}{dt} + KZ - F_{int} = F_o e^{j\omega t}$$

Where $F_{int}$ is the interaction force between the tip and the sample,

Z is the vertical displacement $\gamma$ is the damping coefficient and $\omega$ represents angular frequency.

In other words, the cantilever oscillates with an effective damping/viscosity that can be electronically tuned.

FIG. 4 schematically illustrates a control system for use with a scanning force microscope. The scanning force microscope has a sensor head 20 which comprises a transducer 22, such as a piezo electric device and a sensor element 24, which typically (though not exclusively) is a photo diode for detecting motion of the cantilever 23. These elements are commercially available and need not be described further here. A amplitude and/or phase feed back unit 26 is arranged to be responsive to the sensor 24 and to modify the driving signal to the transducer 20. However, unlike the prior art system shown in FIG. 3 this control system also includes a frequency tracking element 28 which can modify the drive frequency applied to the transducer in order to follow changes in the resonant frequency of the cantilever, and a filter to filter the amplitude response of the cantilever at frequencies corresponding to the higher harmonics of the cantilever.

As shown in FIG. 5, a first embodiment of the present invention combines the feedback and frequency tracking electronics 26 and 28 within a signal processing unit 30. A voltage controlled oscillator 32 has an output connected to a first input of a summer 34 and also to a reference input (ref) of a phase detector 36. An output of the summer 34 is provided to a transducer 22 constituting part of the microscope scanning head. An output of the position sensor 24 is provided to an input of a low pass filter 70 and also to a signal input (sig) of the phase detector 36. An output of the filter 70 is provided as an input of a variable phase shifter 37. An output of the phase detector 36 is provided to an input of a controller 38 such as a proportional-integral (PI) controller which has an output connected to a control input of the voltage controlled oscillator 32. An output of the variable phase shifter 37 is provided to an input of a variable gain amplifier 40. An output of a variable gain amplifier 40 is provided to a second summing input of the summer 34. An output of the sensor 24 is also provided as an output 42 which may be connected (optionally via buffering) to data acquisition apparatus.

The phase detector 36, PI controller 38 and voltage controlled oscillator 32 form a frequency phase locked loop controlling the drive signal. The action of the phase detector 36 and PI controller 38 is selected to vary the output frequency of the voltage controlled oscillator in order to maintain a predetermined phase difference between the signals occurring at the reference input and signal input of the phase detector 36. By setting this predetermined phase difference to be 90°, it is possible to ensure that the voltage controlled oscillator always drives the cantilever of the microscope at its resonant frequency. This resonance condition is maintained in a feedback loop such that this condition is always satisfied even though the resonant frequency of the cantilever itself may change during operation in a fluid environment. Other predetermined phase differences can be maintained if desired for operation away from resonance, for example on the steep sided section of the resonance curve.

The variable phase shifter 37 and variable gain amplifier 40 serve to form a positive feedback loop optimising the characteristics of the cantilever, such as its Q factor. The variable phase shifter is included to compensate for any phase shift occurring in the amplifier and/or low pass filter such that the output of the amplifier can remain in phase with the output of the voltage controlled oscillator. Thus positive feedback is provided which serves to further enhance oscillations of a relatively large intensity by increasing the mechanical drive applied to the transducer. By controlling the transfer function of the variable gain amplifier, it becomes possible to synthesise a higher Q factor for the oscillating cantilever than that which it actually possesses. Some modification of the positive feedback system may be provided to stabilise the amplitude of the cantilever oscillation so as to ensure it's response does not become unpredictable or unrepeatable, and that damage does not occur.

FIG. 6 shows a further embodiment, in which like parts are represented by like reference numerals. This arrangement does not include the phase locked loop in the previous embodiment, but is otherwise the same. A sinusoidal signal, for instance from a signal generator, provides the first input 43 of the summer 34. Because of the presence of the filter 70, positive feedback is provided without the destabilising presence of the higher harmonics in the feedback signal. The phase lock loop can be omitted providing the resonant frequency is not substantially changed by approaching the surface, for example if the drive frequency is selected close to the surface.

FIG. 7 shows a further embodiment, in which like parts are represented by like reference numerals. In this arrangement the output of the voltage controlled oscillator is provided to a first input of a voltage controlled variable gain amplifier 50 whose output is connected to the transducer. An output of the sensor 24 is connected to a sensing input of the phase detector 36, as described with reference to FIG. 5, but also to an input of a rectifier 52. The output of the rectifier 52 is connected to a gain control input of the variable gain amplifier. As before, the phase detector 36, PI controller 38 and voltage controlled oscillator 32 form a frequency, feedback control loop. The rectifier 52 detects the root mean square or peak value of the oscillation of the cantilever, and uses this to control the gain applied by the variable gain amplifier to the output of the voltage controlled oscillator. Thus as before, the magnitude of the drive signal applied to the transducer 22 increases as the magnitude of oscillation of the cantilever increases.

FIG. 8 shows a further alternative arrangement in which the phase detector 36, PI controller 38 and voltage controlled oscillator 32 are connected as described hereinbefore. However the output of the voltage controlled oscillator is provided to a input of a voltage controlled variable phase shifter 62. An output of the phase shifter 62 is provided to the transducer 22. An output of the sensor 24 is provided to a first input of a second phase detector 60, a second input of which receives an output from the voltage controlled variable phase shifter. The phase detector 60 forms a signal representative of the phase difference between its inputs, and the signal is used to control the phase shift introduced by the variable phase shifter 62. The positive feedback loop formed by phase detector 60 and phase shifter 62 has a significantly shorter time constant than the phase locked loop. The positive feedback loop increases the effective quality and reduces the error within the phase locked loop.

Figure 1:
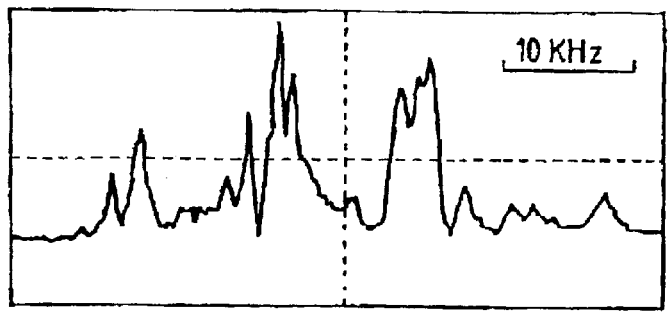
FIG. 1 is the spectrum of a v shaped cantilever (k=0.58 $Nm^{-1}$) excited by mechanic-acoustic excitation of a fluid.
Figure 2:
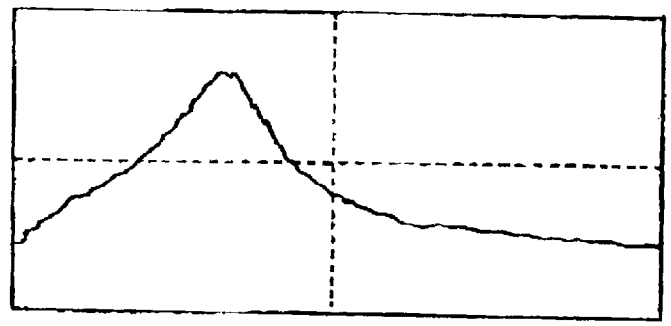
FIG. 2 is the excitation spectrum of the cantilever of FIG. 1 in a fluid, but excited using a magnetic field.

By way of comparison, FIG. 9 and FIG. 10 show the response of the cantilever when driven using a control circuit constituting an embodiment of the present invention. FIG. 9 shows the spectrum of the cantilever when excited through mechanic-acoustic waves, and consequently compares directly with FIG. 1. FIG. 10 shows the resonant spectrum when the cantilever is excited via a magnetic field, and consequently compares with FIG. 2. The magnetic excitation produces a very narrow resonance peak with an effective Q of approximately 280. Furthermore, this peak corresponds to the most dominant of those peaks located when the cantilever is driven by mechanic-acoustic waves. The high effective Q overcomes the low transmission of the excitation force through the liquid at the natural frequency of the cantilever, and allows the identification of the resonance frequency without the need of a direct excitation method in which a magnetic cantilever coating is required.

The sensitivity of the cantilever is proportional to Q, and effective Q factors have been reached which are more than two orders of magnitude greater than the natural Q of the cantilever in fluid. The Inventors have checked the improved sensitivity by imaging a very soft sample of 1% agoros gel. This sample had an elastic modulus of 150 kPa. FIGS. 11a and 11b show the topography and phase shift image of the sample with a standard silicon nitride tip having a normal spring constant of 0.37 Nm$^{-1}$. The free and damped amplitudes are 6 and 5.5 nm respectively. The same region of the sample was imaged with the same tip using a synthesised Q for about 153. This produced a significant increase in the spatial resolution as a consequence of the lower force applied. Lower forces imply lower indentations of the tip into the gel and therefore higher resolution, as shown in FIG. 11c. On the other hand, the phase shift between the cantilever oscillation and the excitation signal is more sensitive to topographic changes, as shown in FIG. 11d.

The inclusion of electronic tuning of the quality factor increases the sensitivity of the microscope in an ordinary tapping mode in liquid.

An atomic force microscope having a resonating cantilever and quality factor control and frequency tracking control can be used to investigate the properties of a single molecule. In essence, the resonating cantilever can be brought into contact with a molecule and then the cantilever slowly raised above the surface of the sample so as to stretch the molecule. Where this has been done with non vibrating cantilevers, the result obtained is a force vs displacement curve. However, when an investigation is performed using a vibrating cantilever, it is also possible to estimate the conservative, elastic and dissipative forces. The dissipative forces can be examined by looking at the change in amplitude of the resonance peak, whereas the elastic forces can be examined by virtue of the change in frequency. FIG. 12 shows the results obtained from investigating a molecule. The abscissa represents the movement in the force sensing (stretching) direction. The curve labelled "A" represents the force gradient with respect to changing distance. The curve labelled "B" represents the change in amplitude, and hence is indicative of local dissipation, and the curve "C" represents the total force experienced by the cantilever. It can be seen that contact between the tip and the sample fails at about 120 nm on the X axis.

In a further embodiment of the present invention as shown in FIG. 13, the basic arrangement shown in FIG. 5 is modified by the inclusion of a further feedback loop comprising a variable phase shifter 80 which receives a further input from the sensor 24, and a further variable gain amplifier 82 which receives an input from an output of the variable phase shifter 80. Also, the low pass filter 70 may be omitted, although better results may be obtained if it remains in the circuit. The output of the variable gain amplifier 82 is summed with the output of the voltage controlled oscillator 32. This further feedback loop is arranged to shift the sensor signal through 0 or 180 deg in order to change the effective spring constant, and thereby the resonant frequency. Optionally, the frequency tracking can be employed as hereinbefore described, or it may be omitted.

Ideally the effect of this two feedback loops in the differential equation of a oscillator is:

$$Mz''+\gamma z'+kz=F_{int}+F_o e^{i\omega t}+G_1 z e^{i\phi 1}+G_2 z e^{i\phi 2}$$

Where M is the effective mass of the oscillator, $\gamma$ is the damping constant, k is the spring constant, $F_{int}$ is a possible interaction between the cantilever and the sample or environment and z represents the oscillator motion. The excitation force is the sum of a sinusoidal excitation force $F_o e^{i\omega t}$, the sensor signal amplified and phase shifted by the first feedback loop $G_1 z e^{i\phi 1}$, and the sensor signal amplified and phase shifted by the second feedback loop, $G_1 z e^{i\phi 2}$. The solution of this equation can be approximated by $z=Ae^{i(\omega t\phi)}$.

For instance, if we fix $\phi 1=90$ deg and $\phi 2=0$ or 180 deg, the first feedback loop changes the effective damping constant by $\gamma_{eff}=\gamma-G_1/\omega$, and the second feedback loop changes the effective spring constant by $k_{eff}=\pm G_2$.

The sensitivity with which the oscillation frequency can be detected allows a resonating sensor to be used in other situations. For example a miniature sensor may be coated with a reagent such that, in the presence of selected chemicals, a chemical reaction takes place.

The micro-cantilever is partially or totally surface treated with a compound selective substance having substantially exclusive affinity for a targeted compound in a liquid environment. The micro-cantilever sensor is also provided with one of the oscillation detection methods described before. The frequency detection method is capable of detecting changes in the resonance frequency, amplitude or phase of the vibrated micro-cantilever in the monitored liquid solution. Upon insertion into a monitored liquid solution, molecules of the targeted chemical attach to the treated regions of the micro-cantilever resulting in a change in oscillating mass as well as a change in micro-cantilever spring constant or mechanical properties of the cantilever thereby influencing the parameters of the micro-cantilever oscillation. Furthermore, the molecular attachment of the target chemical to the treated regions induce areas of mechanical strain in the micro-cantilever consistent with the treated regions thereby influencing micro-cantilever oscillation. The rate at which the treated micro-cantilever accumulates the target chemical is a function of the target chemical concentration. Consequently, the extent of micro-cantilever oscillation change (frequency, amplitude of phase) is related to the concentration of target chemical within the monitored liquid solution. Similarly, the equilibrium level of accumulated target chemical will depend on the target chemical concentration; consequently the extent of micro-cantilever oscillation change (frequency, amplitude or phase) is related to the concentration of target chemical within the monitored liquid solution.

FIG. 14 schematically illustrates a chemical/bio-chemical sensor utilising a resonating cantilever. The drive arrangement is identical to that shown in FIG. 5 of the accompanying drawings, except that this time the resonating cantilever 100 is driven magnetically by a magnetic field generated by a coil 102 situated adjacent the cantilever. The magnetic coating on the cantilever 100 was produced by coating the cantilever with chromium and then cobalt using thermal evaporation. A magnetic moment was produced in the thin film with a strongly orientated magnetic field.

In this experiment, the cantilever was sensitised to ethanol by depositing a 2500 mm thick coating of poly-methyl-methacrylate (PMMA) on both sides of the cantilever. However, antibodies may also be immobilised on one side of the cantilever. The applicant has immobilised the antibody BRAC30 on one side of the cantilever in order to detect the presence of the secondary antibody STAR71 which recognises an epitope located on the Fe fragment of BRAC30. In order to do this the original gold coating on the cantilevers (which coating had been placed there by their manufacture) was removed by immersion in a mixture of hydrochloric and nitric acid. Then one side of the cantilever was coated with five nanometers of chromium and 50 nanometers of gold using thermal deposition. The gold coated cantilevers were immersed in one milimolar cystamine dihydroclhoride for 60 minutes and washed in two molar NaOH and miliQ water. The cantilevers were then immersed in glutoraldehyde (1%) for 60 minutes and rinsed in miliQ water. A droplet of the antibody BRAC30 solution was deposited for 60 minutes. The glutoraldehyde acts as a covalent linker between the substrate and the antibody. The remaining aldehyde sites were then saturated by immersion of the cantilever for a few minutes in a suitable solution (bovine serum albumen solution).

This cantilever, as was found with the cantilevers for the scanning probe microscope, exhibited a significant reduction in Q once the cantilever was immersed in liquid. In this instance, the resonant frequency in air of the cantilever was approximately 50 kHz with a quality factor of approximately 70. Once the cantilever was immersed in liquid the resonant frequency reduced to approximately 16 kHz as a consequence in the increase of effective mass of the cantilever as it drags the surrounding liquid during oscillation. The quality factor also reduced to a value of approximately 2 due to hydrodynamic damping between the cantilever and the liquid environment. However, by using the feedback control circuit a synthesised quality of Q of approximately 625 was obtained. Higher quality factors can be synthesised and the applicant has achieved quality factors in excess of 1000 but the oscillation can become unstable for higher values as a consequence of local variations in the velocity of the liquid owing to thermal fluctuations.

The sensitivity of such a chemical sensor is approximately proportional to its quality factor. A resonant frequency is detected by the phase lock loop and measures the phase shift between the cantilever oscillation and the driving signal, which phase difference is 90° at resonance. The phase shift deviation with respect to resonance is approximately:

$$\Delta\Phi = 2Q(\omega-\omega_0)/\omega_0$$

for small $\Delta\Phi$. Thus higher Q factors allow smaller phase shifts to be resolved.

A significant feature of resonating cantilevers is that they are substantially insensitive to long term thermal drift which may show up in the DC response of a cantilever in liquid. FIG. 15a demonstrates a change in cantilever deflection, which was measured at approximately 8 nanometers per minute during an hour of operation, whereas the corresponding resonant frequency was virtually unaffected, changing by substantially no more than 2 Hz over the time period.

The use of high value synthesised Q factors also enables the sensor to be highly sensitive to the presence of a reagent. FIGS. 16a and 16b show the results obtained from an experiment where a cantilever was coated with a polymer layer of PMMA. FIG. 16a shows the real time response of the change in resonance frequency for exposure of the cantilever to 0.5% ethanol in water. The resulting response consists of two parts. Firstly, the resonant frequency drops suddenly by 50 Hz due to the diffusion of the analyte into the polymer layer, thereby increasing cantilever mass. Secondly, the resonant frequency increases again as the ethanol diffuses out of the polymer layer until it has completely evaporated. The applicant has calculated that the effective mass increase resulting in the drop of resonant frequency amounted to approximately 50 picogrammes.

The experiment was repeated, as shown in FIG. 16b, with a solution of 5% ethanol. In this experiment the resonant frequency decreased by approximately 410 Hz. These data suggest that the sensitivity of this sensor is approximately 1% of ethanol per 100 Hz.

FIGS. 17a and 17b show the result of a similar experiment utilising the BRAC30 antibody in order to detect a target antibody, STAR71, in the presence of the cantilever. The STAR71 target antibody binds the receptor molecules attached on one side of the cantilever, thereby changing the surface energy of side of the cantilever with respect to the other. The area of each side then contracts or expands in order to minimise the energy of the system, giving rise to cantilever beading which corresponds to a deflection (Z) of:

$$z = 4\frac{1-v}{Et^2}L^2(\Delta\sigma_t - \Delta\sigma_b)$$

Where v is poisson's coefficient, E is young's modulous, t is the cantilever thickness, L is length and $\Delta\sigma_t$ and $\Delta\sigma_b$ are the surface stress changes on the top and bottom side of the cantilever respectfully. By using $E=96GP_a$ and $v=0.27$ for silicon nitride, the estimated sensitivity is approximately 1.3 mJ/m² per nm of deflection. The surface stress produced results in a tension parallel to the cantilever surface that is proportional to the total surface stress $\Delta\sigma_t+\Delta\sigma_b$. This tension contracts or expands the cantilever, changing the spring constant of the cantilever by:

$$\Delta k = \frac{\pi^2 n}{4 n_j}(\Delta\sigma_t + \Delta\sigma_b)$$

where n is the ratio between the effective mass and total mass of the cantilever and $n_t$ depends on cantilever geometry, being one for an ideal spring.

FIGS. 17a and 17b illustrate an experiment showing the detection of a biological target. Initially, 5 μL of buffer solution were injected into a measurement fluid cell. This resulted in an immediate change in deflection of the cantilever of approximately 7 nm ask illustrated in FIG. 17a, whereas the resonant frequency remain unchanged. This change in deflection is attributed to a difference in temperature between the buffer solution and the liquid in the fluid cell, which resulted in differential thermal expansion of the gold layer on top of the cantilever and the silicon nitride forming the bottom of the cantilever. The resonant frequency of the cantilever is substantially immune to this bi-material effect as the surface stress on one side of the cantilever is substantially balanced by an opposing surface stress on the other side.

After approximately 700 seconds, 5 μL of the target substance were injected in order to reach a concentration of 0.8 μg per ml. The resonant frequency immediately recorded a drop of 63 Hz. This indicates that the surface of the side of the cantilever on the which the receptor molecules were immobilized had decreased as a consequence of these specific binding of the target bio-molecule. The observed frequency change corresponds to a decrease in surface energy of approximately 7 mJ per m². However, in the deflection based measurement as shown in FIG. 17a, the temperature change resulting from the introduction of this solution obscures the change in surface area thus prior art DC detection methods fail to register the introduction of the target bio-molecule, whereas the resonant frequency method does.

Multiple sensors may be fabricated in an array and coated with different reagents. Each may then be addressed individually by time division frequency multiplexing of the control apparatus to excite each resonator in turn. Alternatively, multiple processing channels may be provided in parallel such that the resonators may be addressed concurrently.

In a further embodiment of the control system the phase shift and gain of an amplifier may be selected such that it naturally causes the cantilever to go into resonance. Thus self maintaining oscillations may be established, and once these have, the gain of the amplifier can then be adjusted in a closed loop manner in order to hold the amplitude of oscillation substantially constant.

It is thus possible to provide a sensitive, robust and inexpensive sensor.

What is claimed is:

1. A control apparatus for controlling a driving signal used to stimulate a resonating sensing element, in which the control apparatus is responsive to a sensor used to monitor the motion of the sensing element characterized in that the control apparatus comprises a signal processor for filtering signals from the sensor so as to remove harmonics above a predetermined order from the signal, and drive signal controller responsive to the output of the signal processor for adjusting the driving signal so as to maintain the sensing element in resonance.

2. A control apparatus as claimed in claim 1, characterized in that said signal processor is further arranged to identify a phase shift between the motion of the sensing element and the driving stimulus applied to the element and the drive signal controller adjusts the driving signal so as to maintain the phase shift at substantially a predetermined value.

3. A control apparatus as claimed in claim 1 characterized in that the sensing element is coupled to a drive element via a liquid coupling.

4. A control apparatus as claimed in claim 3, characterized in that the drive element is a piezo-electric element.

5. A control apparatus as claimed in claim 1, characterized in that the sensing element is driven via one of alternating magnetic fields, alternating electrostatic fields, pressure waves and pulsed heating.

6. A control apparatus as claimed in claim 2, in which the predetermined phase shift is substantially 90 degrees.

7. A control apparatus as claimed in claim 2, in which the phase shift is measured by a phase sensitive detector, and the output of the detector is provided to a controller which controller causes a change to the frequency of the driving signal.

8. A control apparatus as claimed in claim 1, further comprising at least one other feedback loop for controlling a property of the drive signal used to stimulate the sensing element.

9. A control apparatus as claimed in claim 8, characterized in that one further feedback loop is provided, and said one further feedback loop controls the magnitude of the drive signal.

10. A control apparatus as claimed in claim 8, characterized in that a signal from the sensor is phase shifted and amplified, said amplification being a function of the amplitude of said signal from the sensor, and combined with the drive signal.

11. A control apparatus as claimed in claim 8, characterized in that an amplitude of the drive signal is modulated as a function of the amplitude of the sensor signal.

12. An apparatus as claimed in claim 8, characterized in that the or one of the further feedback loops forms a feedback loop synthesising an effective quality factor for the sensing element in excess of its actual quality factor.

13. A scanning probe microscope including a control apparatus as claimed in claim 1.

14. A chemical or bio-chemical sensor comprising a resonating sensing element having a receptor therein, where the receptor interacts with a substance under test, in combination with a control apparatus as claimed in claim 1.

15. A sensor as claimed in claim 14, wherein one side of the sensor is coated with a substance sensitive to a target substance under test.

* * * * *